United States Patent [19]

Tanaka

[11] 4,123,088
[45] Oct. 31, 1978

[54] LEAKAGE PREVENTIVE MECHANISM FOR FLEXIBLE HOSES

[75] Inventor: Mamoru Tanaka, Yokohama, Japan

[73] Assignee: Bridgestone Tire Company Limited, Tokyo, Japan

[21] Appl. No.: 875,709

[22] Filed: Feb. 6, 1978

[30] Foreign Application Priority Data

Feb. 16, 1977 [JP] Japan .................... 52/16531[U]

[51] Int. Cl.$^2$ ............................................ F16L 39/02
[52] U.S. Cl. ...................................... 285/14; 285/149
[58] Field of Search ........................... 285/149, 13, 14

[56] References Cited

U.S. PATENT DOCUMENTS

| | | | |
|---|---|---|---|
| 1,994,587 | 3/1935 | Nakane | 285/149 |
| 2,220,785 | 11/1940 | Goodall | 285/149 |
| 2,610,869 | 9/1952 | Allison | 285/149 |
| 3,115,353 | 12/1963 | Previati | 285/14 |
| 3,217,282 | 11/1965 | Chevalier et al. | 285/149 X |
| 3,282,611 | 11/1966 | Pierazzuoli | 285/149 X |
| 3,833,754 | 9/1974 | Philibert | 285/149 X |

FOREIGN PATENT DOCUMENTS 810,452 8/1951 Fed. Rep. of Germany .......... 285/149
954,051 4/1964 United Kingdom .................... 285/149

*Primary Examiner*—Thomas F. Callaghan
*Attorney, Agent, or Firm*—Sughrue, Rothwell, Mion, Zinn and Macpeak

[57] ABSTRACT

A leakage preventive mechanism for flexible hoses through which is transferred fluid under a high pressure is disclosed. The mechanism comprises a rib made integral with a nipple portion of a nipple flange and circumferentially extending around said nipple portion. An end of a reinforcing layer embedded in the flexible hose passes over the rib and is wrapped around a bead wire arranged near the rib to form an inclined turn-back portion. A pair of rings are urged against the inclined turn-back portion of the reinforcing layer by means of bolts, whereby the inclined turn-back portion of the reinforcing layer functions as a packing for preventing the fluid from passing over the rib.

4 Claims, 2 Drawing Figures

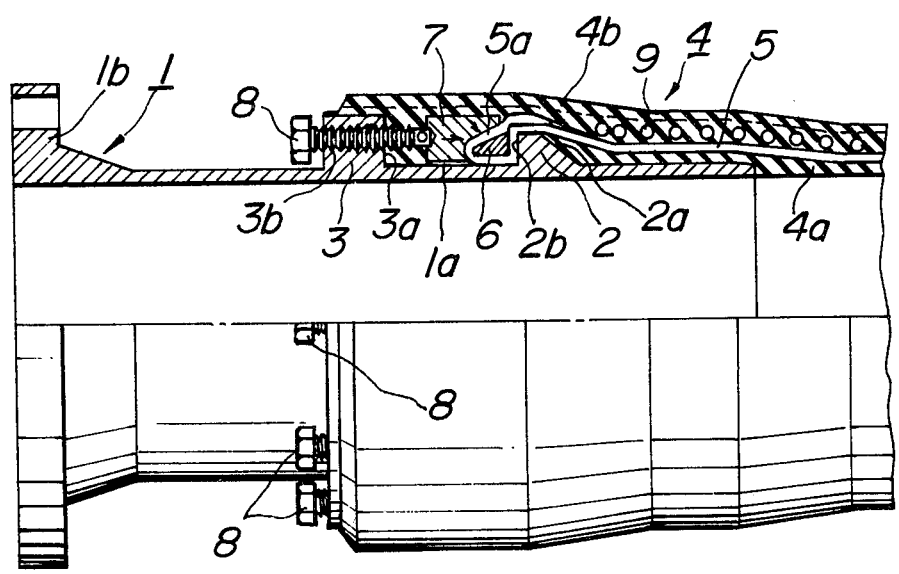
FIG_1
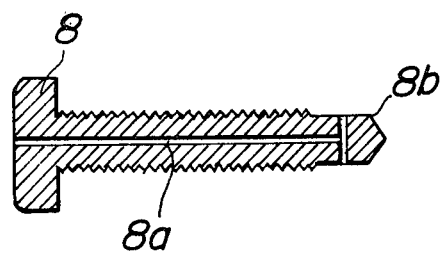
FIG_2

LEAKAGE PREVENTIVE MECHANISM FOR FLEXIBLE HOSES

BACKGROUND OF THE INVENTION

1. Field of the Invention

This invention relates to a leakage preventive mechanism for flexible hoses through which is transferred fluid under a high pressure.

2. Description of the Prior Art

In the case of transferring fluid under a high pressure through a flexible hose, if the high pressure fluid is leaked out of the flexible hose, not only there involves much amount of fluid loss, but also there is a risk of environment being polluted by the leaked fluid or a risk of a district being suffered from a disaster depending on the kind of the fluid.

In the case of firmly securing the end of a flexible hose to a connection metal fitting such as a nipple flange, heretofore it has been the common practice to fit the flexible hose end around a plurality of axially distant apart circumferential ribs made integral with a nipple portion of the nipple flange and then to arrange a semicircular clamping member in a depressed portion formed between adjacent ribs and subsequently to firmly tightening together flanges of the clamping members by means of bolts. Such tightening measure, however, renders it impossible to positively tighten the overall periphery of the flexible hose around the nipple portion owing to the presence of a gap between the flanges of the clamping members. As a result, it is impossible to completely prevent the fluid from leaking out of the flexible hose. In addition, the presence of the tightening bolts projected out the periphery of the flexible hose makes the flexible hose inconvenient in handling.

SUMMARY OF THE INVENTION

An object of the invention, therefore, is to provide a leakage preventive mechanism for flexible hoses, which can eliminate the above mentioned drawbacks which have been encountered with the prior art techniques.

A feature of the invention is the provision of a leakage preventive mechanism for flexible hoses, comprising a nipple flange including a nipple portion engageable with an end portion of a flexible hose, a rib and a bolt supporting base made integral with said nipple portion of the nipple flange and circumferentially extending around said nipple portion, said rib and bolt supporting base being axially spaced apart from each other, a reinforcing layer embedded in said flexible hose and surrounding an end of said nipple portion of the nipple flange, said reinforcing layer having a front end portion passing over said rib toward said bolt supporting base, a bead wire surrounding said front end portion of said reinforcing layer, said front end portion of said reinforcing layer being wrapped around said bead wire from its lower portion toward the upper portion thereof to form a turn-back portion inclined at an angle to said nipple portion of the nipple flange, a pair of rings surrounding said nipple portion and circumferentially making contact with the outside surface of said inclined turn-back portion of said reinforcing layer, and a plurality of bolts threadedly engaged with said bolt supporting base and urging said rings through said inclined turn-back portion of said reinforcing layer and said bead wire against said rib.

BRIEF DESCRIPTION OF THE DRAWINGS

The invention will now be described in greater detail with reference to the accompanying drawings, wherein:

FIG. 1 is a front elevational view of one embodiment of a leakage preventive mechanism for flexible hoses according to the invention, partly shown in section; and FIG. 2 is a cross-sectional view of a modified embodiment of a bolt according to the invention.

DESCRIPTION OF THE PREFERRED EMBODIMENTS

Referring to FIG. 1, reference numeral 1 designates a nipple flange having a nipple portion 1a which is provided with a rib 2 and a bolt supporting base 3 made integral with the nipple portion 1a and axially spaced apart from each other. The rib 2 is frustum-shaped in section and provided at its one side facing the nipple end with a downwardly inclined surface 2a and provided at the other side facing the bolt supporting base 3 with a vertical surface 2b. The bolt supporting base 3 spaced apart from the rib 2 toward a flange 1b of the nipple flange 1 is rectangle-shaped in section and provided at its both sides with vertical surfaces 3a, 3b, respectively.

A flexible hose 4 is provided at its innermost portion with a layer 4a formed of a flexible substance such as rubber, plastic or the like. The innermost layer 4a extends up to the inclined side surface 2a of the rib 2 so as to cover it. About the innermost layer 4a is superimposed a pressure resistant reinforcing layer 5 passing over the rib 2 toward the bolt supporting base 3. Near the vertical side surface 2b of the rib 2 and outside the reinforcing layer 5 is arranged a bead wire 6 and the end of the reinforcing layer 5 is wrapped around the bead wire 6 from its lower portion toward the upper portion thereof to form a turn-back portion 5a. The reinforcing layer 5 may be formed of cloth, steel cord, textile cord or the like. The bead wire 6 is triangle-shaped in section with its vertical side opposed to the vertical surface 2b of the frustum-shaped rib 2 and with an inclined surface facing the bolt supporting base 3. The turn-back portion 5a, therefore, becomes triangular in shape as shown in FIG. 1, but may be made frustum or the like with an inclined surface facing the bolt supporting base 3 so as to be closely engaged with the vertical side surface 2b of the rib 2.

To that side of the turn-back portion 5a of the reinforcing layer 5 wrapped around the bead wire 6 facing the bolt supporting base 3 are opposed a pair of semicircular metal rings 7, 7 which are wound around the nipple portion 1a and so shaped that the metal rings 7, 7 make contact with both the circumferentially outside surface of the inclined turn-back portion 5a of the reinforcing layer 5 and the side surface of the turn-back portion 5a facing the bolt supporting base 3. The metal rings 7, 7 are urged through the inclined turn-back portion 5a of the reinforcing layer 5 and the bead wire 6 against the rib 2 by means of bolts 8 threadedly engaged with the bolt supporting base 3.

A wire 9 is spirally wound around the reinforcing layer 5 and the wire 9 and the bolt supporting base 3 are covered with a flexible outermost layer 4b formed of cloth, textile cord and flexible member.

It is preferable to change the number of the bolts 8 urged against the rings 7 in dependence with the diameter of the nipple portion 1a of the nipple flange 1 or with the fluid pressure. In addition, the bolt 8 may preferably be engaged with the ring 7 through a conical end of the bolt 8 and a corresponding conical hole provided on the ring 7 for the purpose of uniformly urging the bolt 8 against the ring 7.

In the present embodiment, in the case of tightly securing the flexible hose 4 to the nipple portion 1a of the nipple flange 1, each of the bolts 8 is uniformly tightened so as to urge the ring 7 against the inclined turn-back portion 5a of the reinforcing layer 5. As a result, the inclined turn-back portion 5a of the reinforcing layer 5 wrapped around the bead wire 6 is subjected to forces shown by arrows in FIG. 1, that is, forces directed toward both the vertical side surface 2b of the rib 2 and the outside surface of the nipple portion 1a and hence is closely sticked to both the vertical side surface 2b of the rib 2 and the outside surface of the nipple portion 1a.

As a result, even if the fluid is penetrated into a gap formed between the nipple end and the innermost layer 4a of the flexible hose 4, the inclined turn-back portion 5a of the reinforcing layer 5 functions as a packing for preventing the fluid from passing over the rib 2.

In FIG. 2 is shown a modified form of a bolt 8. The bolt 8 shown in FIG. 2 is provided along its axial direction with an elongate hole 8a and provided at its front end with a crossing hole 8b extending in a direction perpendicular to the elongate hole 8a and communicated therewith.

If the bolt 8 is not sufficiently tightened, there is a risk of the fluid being leaked out the gap formed between the nipple end and the innermost layer 4a of the flexible hose 4 and reached to the front end of the bolt 8. In such a case, the fluid passes through the crossing hole 8b and elongate hole 8a to the outside of the bolt 8, so that the leakage of fluid can easily be ascertained in a rapid manner and that the bolt 8 can be sufficiently tightened so as to prevent the leakage of fluid.

The invention is not limited to the above described embodiment only, but various changes and modifications may be made. For example, the leakage preventive mechanism according to the invention may be applied to members other than the nipple flange for the flexible hose. Alternatively, use may be made of a plurality of ribs instead of one rib.

As stated hereinbefore, the use of the measure described for urging that portion of the reinforcing layer which is wrapped around the bead wire toward both the vertical side surface of the rib and the outside surface of the nipple portion ensures a complete and close fixing of the total periphery of the flexible hose with the nipple portion without deforming both the innermost layer and the outermost layer of the flexible hose and provides the important advantage that it is possible to prevent both the leakage of fluid and the removal of the flexible hose from the nipple portion of the nipple flange in a positive manner and that since any projection out of the outer periphery of the flexible hose is absent the flexible hose can be handled in an extremely easy manner.

What is claimed is:

1. A leakage preventive mechanism for flexible hoses, comprising a nipple flange including a nipple portion engageable with an end portion of a flexible hose, a rib and a bolt supporting base made integral with said nipple portion of the nipple flange and circumferentially extending around said nipple portion, said rib and bolt supporting base being axially spaced apart from each other, a reinforcing layer embedded in said flexible hose and surrounding an end of said nipple portion of the nipple flange, said reinforcing layer having a front end portion passing over said rib toward said bolt supporting base, a bead wire surrounding said front end portion of said reinforcing layer, said front end portion of said reinforcing layer being wrapped around said bead wire from its lower portion toward the upper portion thereof to form a turn-back portion inclined at an angle to said nipple portion of the nipple flange, a pair of rings surrounding said nipple portion and circumferentially making contact with the outside surface of said inclined turn-back portion of said reinforcing layer, and a plurality of bolts threadedly engaged with said bolt supporting base and urging said rings through said inclined turn-back portion of said reinforcing layer and said bead wire against said rib.

2. The mechanism according to claim 1, wherein said rib is of a frustum-shaped one provided at its one side facing the nipple end with a downwardly inclined surface and provided at the other side facing said bolt supporting base with a vertical surface.

3. The mechanism according to claim 2, wherein said bead wire is of a triangle-shaped in section with its vertical side opposed to said vertical surface of the frustum-shaped rib and with an inclined side facing said pair of rings and made contact through said outside surface of said turn-back portion of said reinforcing layer with said pair of rings.

4. The mechanism according to claim 1, wherein said bolt is provided along its axial direction with an elongate hole and provided at its front end with a crossing hole extending in a direction perpendicular to said elongate hole and communicated therewith.

* * * * *